United States Patent
Gelinotte et al.

(10) Patent No.: US 11,676,445 B2
(45) Date of Patent: *Jun. 13, 2023

(54) COUNTING GAMING CHIPS

(71) Applicant: ANGEL GROUP CO., LTD., Shiga (JP)

(72) Inventors: Emmanuel Gelinotte, Savigny les Beaune (FR); Jeffrey L. Reed, Las Vegas, NV (US)

(73) Assignee: ANGEL GROUP CO., LTD., Shiga (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/053,432

(22) PCT Filed: May 9, 2019

(86) PCT No.: PCT/US2019/031452
§ 371 (c)(1),
(2) Date: Nov. 6, 2020

(87) PCT Pub. No.: WO2019/217639
PCT Pub. Date: Nov. 14, 2019

(65) Prior Publication Data
US 2021/0248871 A1 Aug. 12, 2021

Related U.S. Application Data

(60) Provisional application No. 62/668,936, filed on May 9, 2018.

(51) Int. Cl.
*G07F 17/32* (2006.01)
*G06T 7/70* (2017.01)
(Continued)

(52) U.S. Cl.
CPC .............. *G07F 17/322* (2013.01); *G06T 7/70* (2017.01); *G07F 17/3232* (2013.01);
(Continued)

(58) Field of Classification Search
CPC .............. G07F 17/3248; G07F 17/322; G07F 17/3241; A63F 11/002; A63F 2001/006
See application file for complete search history.

(56) References Cited

U.S. PATENT DOCUMENTS 11,030,855 B1 * 6/2021 Halsey ................ G07F 17/3248
2003/0022614 A1 * 1/2003 Momemy ................ G07D 9/06
453/17

(Continued)

FOREIGN PATENT DOCUMENTS

CA 2819672 A1 12/2014

OTHER PUBLICATIONS

International Search Report dated Jul. 24, 2019 issued in PCT Application PCT/US2019/031452.
(Continued)

*Primary Examiner* — Jasson H Yoo
(74) *Attorney, Agent, or Firm* — Norton Rose Fulbright US LLP (57) ABSTRACT

An image can be captured from an imaging device. A gaming chip tube can be identified in a gaming chip tray. A first position can be determined that corresponds to a bottom of the gaming chip tube. A spacer can be identified by recognizing a predefined pattern on the spacer. A second position can be determined corresponding to the spacer. A count of gaming chips can be determined based at least in part on the first and second positions.

24 Claims, 7 Drawing Sheets

(52) U.S. Cl.
CPC ...... *G07F 17/3241* (2013.01); *G07F 17/3248* (2013.01); *G06T 2207/30242* (2013.01)

(56) References Cited

U.S. PATENT DOCUMENTS

| | | |
|---|---|---|
| 2005/0026680 A1* | 2/2005 | Gururajan ............... G07F 17/32 463/25 |
| 2005/0272501 A1 | 12/2005 | Tran et al. |
| 2006/0160600 A1 | 7/2006 | Hill et al. |
| 2007/0184893 A1 | 8/2007 | Miller et al. |
| 2007/0184898 A1* | 8/2007 | Miller .................... G07D 9/002 463/29 |
| 2009/0075725 A1 | 3/2009 | Koyama |
| 2012/0252564 A1 | 10/2012 | Moore et al. |
| 2016/0328604 A1 | 11/2016 | Bulzacki |
| 2017/0039807 A1 | 2/2017 | Shigeta |
| 2018/0075698 A1 | 3/2018 | Shigeta |
| 2019/0213830 A1* | 7/2019 | Main, Jr. ............. G07F 17/3234 |

OTHER PUBLICATIONS

U.S. Final Office Action dated Apr. 4, 2022 issued for U.S. Appl. No. 16/498,011.

* cited by examiner

COUNTING GAMING CHIPS

CROSS-REFERENCE TO RELATED APPLICATIONS

This application is a national phase application under 35 U.S.C. § 371 of International Application No. PCT/US2019/031452 filed May 9, 2019, which claims the benefit of U.S. Provisional Application No. 62/668,936 filed May 9, 2018, the entire contents of each of which is incorporated herein by reference.

BACKGROUND

Gaming chips can be used in a casino in lieu of currency. The gaming chips can be made from various materials including colored metals, injection-molded plastics, and compression molded clay. The gaming chips can be stored in a chip tray. The chip tray can be placed in a gaming table. A casino can include cameras to enable security to monitor the gaming floor.

SUMMARY

A system can include one or more imaging devices and one or more computing devices. The imaging device can capture a portion of a gaming table. The computing device can be in communication with the imaging device. The computing device can capture an image from the imaging device. The computing device can identify a gaming chip tube in a gaming chip tray, determine a first position corresponding to a bottom of the gaming chip tube, identify a spacer based at least in part on recognizing a predefined pattern on the spacer, determine a second position corresponding to the spacer, and determine a count of gaming chips in the gaming chip tube based at least in part on the first position and the second position.

A method can include capturing an image corresponding to a gaming chip tray via one or more one imaging device. The method can include identifying a gaming chip tube in the gaming chip tray via one or more computing device. The method can include determining a first position corresponding to a bottom of the gaming chip tube. The method can include identifying a spacer based at least in part on recognizing a predefined pattern on the spacer. The method can include determining a second position corresponding to the spacer. The method can include determining a count of gaming chips in the gaming chip tube based at least in part on the first position and the second position.

A non-transitory computer-readable medium can embody a program. When the program is executed by one or more computing devices, the program can cause the computing device to perform various functionality. The program can cause the computing device to obtain an image from at least one imaging device. The program can cause the computing device to identify a gaming chip tube in a gaming chip tray. The program can cause the computing device to determine a first position corresponding to a bottom of the gaming chip tube. The program can cause the computing device to identify a spacer based at least in part on recognizing a predefined pattern on the spacer. The program can cause the computing device to determine a second position corresponding to the spacer. The program can cause the computing device to determine a count of gaming chips in the gaming chip tube based at least in part on the first position and the second position.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the embodiments and the advantages thereof, reference is now made to the following description, in conjunction with the accompanying figures briefly described as follows.

The drawings illustrate only example embodiments and are therefore not to be considered limiting of the scope described herein, as other equally effective embodiments are within the scope and spirit of this disclosure. The elements and features shown in the drawings are not necessarily drawn to scale, the emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Gaming chips can be stacked together in a chip tray on a gaming table. In some environments, using visual recognition to identify each individual gaming chip can be inconsistent. The gaming chips in a gaming chip tube of a chip tray can all correspond to a single denomination. The edges of the gaming chips can have a shared pattern. The individual gaming chips in a chip tray may be difficult to differentiate between. The visual recognition can depend on lighting conditions, the distance of a camera from the chip tray, and the angle of the camera to the chip tray.

The accuracy of counting gaming chips using visual recognition can be increased by placing a spacer on one or both sides of a stack of gaming chips in a gaming chip tube. The spacer can be similar to a gaming chip with a different pattern on the edge. A dealer can place a spacer at the end of each stack of gaming chips. The pattern can be selected to enable easy visual recognition in contrast to other gaming chips. Rather than, or in addition to, recognizing each individual gaming chip in a stack, a size of the stack can be determined by measuring from the start of the stack of gaming chips to a spacer or from a first spacer to a second spacer. The width of the stack of gaming chips can be reliably determined because of the ability to recognize the spacer in contrast to the gaming chips.

Figure 1:
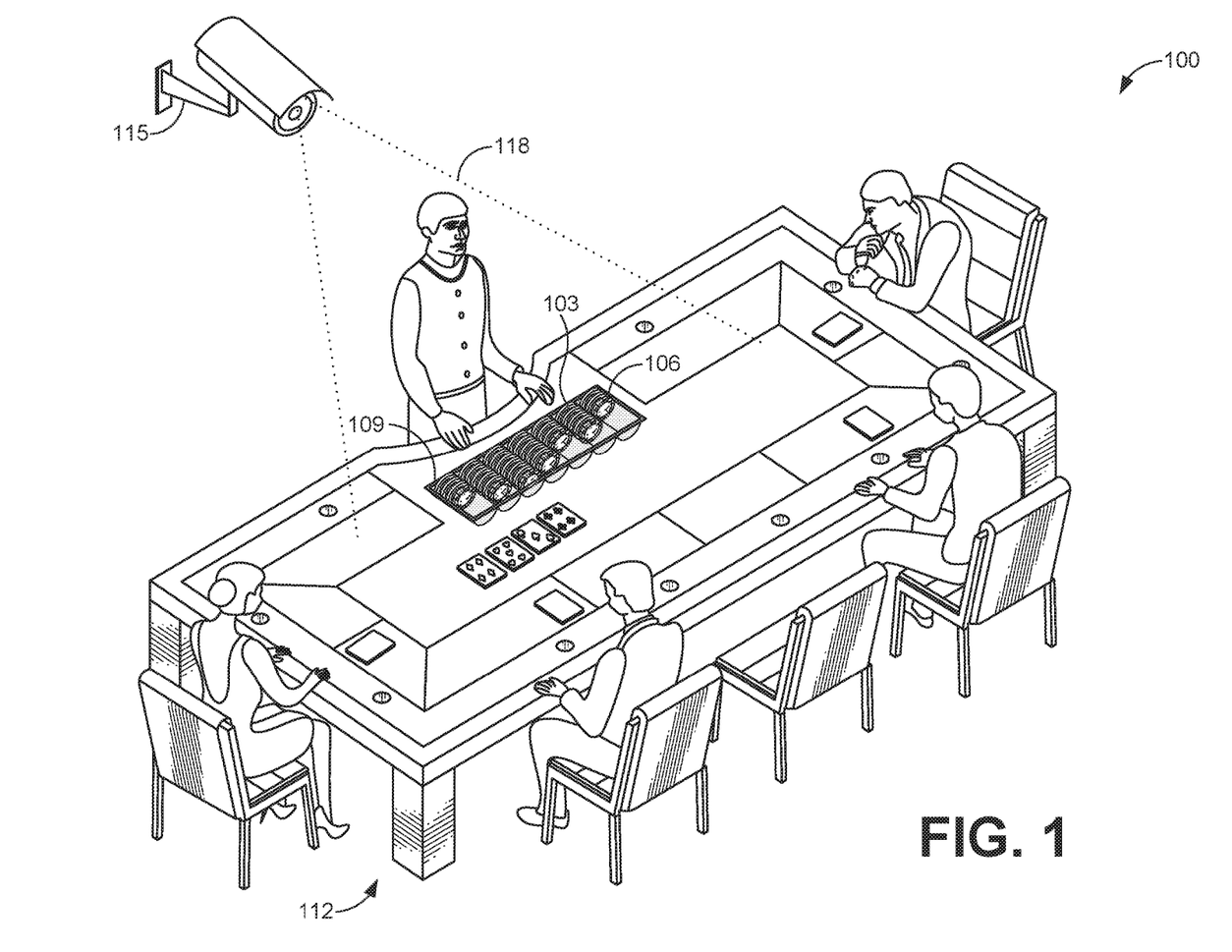
FIG. 1 is a drawing of a gaming environment according to various embodiments of the present disclosure.

Turning now to the drawings, exemplary embodiments are described in detail. With reference to FIG. 1, shown is an example gaming environment 100 according to various embodiments of the present disclosure. The gaming environment 100 includes one or more gaming chips 103 and spacers 106 in a chip tray 109 of a gaming table 112. One or more imaging devices 115 can capture the gaming table 112 in a field of view 118. Each imaging device 115 can capture at least a portion of the gaming table 112 within the field of view 118. Each field of view 118 can have a different perspective based on a position and direction of each imaging device 115. The spacer 106 can correspond to a gaming chip 103 with a predetermined pattern included around a periphery. The imaging device 115 can be a still camera, a video camera, or some other light sensing device.

A location of the gaming chips 103 and spacers 106 can be determined by performing image recognition on captures from the imaging devices 115. Because the chip tray 109 can be stationary, a position of the various points on the chip tray 109 can be determined for the field of view 118 of the imaging device 115 and stored in memory. As an example, a starting and ending position of each gaming chip tube in the chip tray 109 can be determined and stored in memory. In some embodiments, the positions in the chip tray 109 can be determined repeatedly. In other embodiments, the position of the predetermined gaming chip tubes can be verified to determine if either the chip tray 109 or the imaging device 115 has moved.

A count of gaming chips 103 in each gaming chip tube can be determined. The distance can be measured from the start of a gaming chip tube to a position of a spacer 106. The distance can be divided by a width of the gaming chip 103 to determine a count. The result can be rounded to the nearest gaming chip 103. The count can be checked periodically. In some embodiments, the count can be checked based on a current state of a wagering game that is being played on the gaming table 112. As an example, the count of the gaming chips 103 can be determined each time one or more cards are dealt and each time gaming chips 103 are received or given.

In one embodiment, a spacer 106 can be placed after a fixed number of gaming chips. As an example, a dealer can place a spacer 106 in a gaming chip tube after every 20 gaming chips 103. By using spacers 106 placed at a fixed frequency, the thickness of the spacer 106 can be reduced or the imaging devices 115 can be placed even further away.

Figure 2:
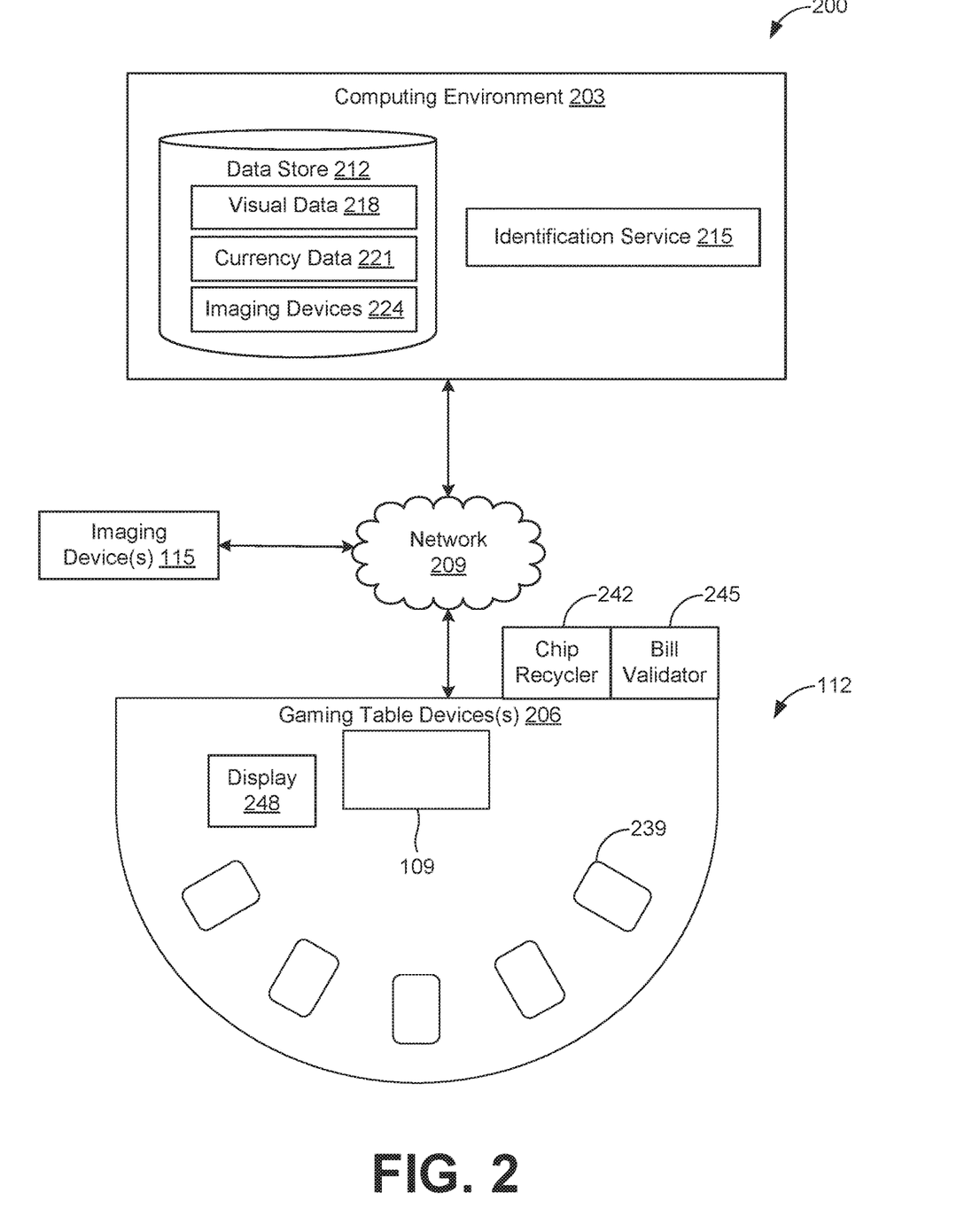
FIG. 2 is a drawing of a gaming environment according to various embodiments of the present disclosure.

With reference to FIG. 2, shown is a gaming environment 200 according to various embodiments of the present disclosure. The gaming environment 100 can correspond to an example of the gaming environment 200. The gaming environment 200 includes a computing environment 203 and one or more gaming table devices 206, and one or more imaging devices 115, which are in data communication with each other via a network 209. A gaming table device 206 can be positioned at a gaming table 112. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 can include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed in the computing environment 203, for example, include an identification service 215, and other applications, services, processes, systems, engines, or functionality not discussed in detail herein. The identification service 215 can be executed to count gaming chips 103 used in a casino. The identification service 215 can determine a count of gaming chips 103 in a chip tray 109 by determining a span between a starting position in a chip tray tube and a position of a spacer 106 (FIG. 1). The identification service 215 can divide the span by a width of the gaming chips 103. It can be appreciated that some or all of the functionality performed by the identification service 215 can be performed by the gaming table device 206. In some embodiments, some or all of the functionality performed by the identification service 215 can be performed by one or more imaging devices 115.

The data stored in the data store 212 includes, for example, visual data 218, currency data 221, imaging devices 224, and potentially other data. The visual data 218 can be used to facilitate visual recognition of different gaming chips 103. The visual data 218 can include images of patterns corresponding to edges of gaming chips 103 and spacers 106. The visual data 218 can include images of a top and a bottom of the gaming chips 103 and the spacers 106. The visual data 218 can include three dimensional (3D) models of gaming chips 103, spacers 106, chip trays 109 including gaming chip tubes, and other gaming items. The visual data 218 can include details of one or more visual security features corresponding to a gaming chip 103 and/or spacer 106.

The currency data 221 can include a list of all active gaming chips including any identifiers associated with the gaming chips, such as, for example, RFID tag identifiers and other identifiers. The currency data 221 can include all gaming chips 103 authorized for use at one or more casinos. The currency data 221 can store information about where each gaming chip 103 is read within the casino. Using this information about reads within the casino, the identification service 215 can track where the gaming chips 103 move throughout a casino.

The imaging devices 224 can include a list of imaging devices 115. The imaging devices 224 can include a position of each of the imaging devices 115. A field of view 118 (FIG. 1) can be different for each imaging device 115. As an example, one imaging device 115 can be positioned on a gaming table 112 while another imaging device 115 is positioned overhead aiming down at the gaming table 112. To enhance recognition, the visual data 218 can include visual data specific to each imaging device 224, which can be based on the field of view 118 for the specific imaging device 115.

The gaming table device 206 is representative of a plurality of gaming tables 112 that may be coupled to the network 209. The gaming table device 206 can include, for example, one or more computing devices with a processor-based system such as a computer system. Such a computer system may be embodied in the form of an embedded computing device or other devices with similar capability. The gaming table device 206 can include a chip tray 109, one or more bet spots 239, a chip recycler 242, a bill validator 245, and a display 248.

A dealer can receive cash from a patron and pay the patron in gaming chips 103 from the chip tray 109. The dealer can put the money in the bill validator 245. The dealer can deal cards for a wagering game at the gaming table device 206. The patrons at the gaming table device 206 can place bets using gaming chips 103 on various outcomes of the wagering game. When a patron wins, the dealer can pay the patron with the gaming chips 103 stored in the chip tray 109. When a patron loses, the dealer can take the wagered gaming chips 103 from the bet spots 239. The dealer can place taken gaming chips in the chip recycler 242 or in the chip tray 109. During use of the gaming table device 206, various gaming chips 103 can be added to and removed from the chip tray 109.

The identification service 215 can receive a video stream from one or more imaging devices 115. The identification service 215 can identify the chip tray 109 in images from the video stream using the visual data 218. The identification service 215 can determine one or more gaming chip tubes in the chip tray 109. For each of the gaming chip tubes, the identification service 215 can identify a first position corresponding to a first end of the gaming chip tube.

The identification service 215 can identify a spacer 106 in the gaming chip tube by recognizing a pattern of the spacer 106 in the chip tray 109. The spacer 106 can be located between the first end and a second end of the gaming chip tube. The spacer 106 can be positioned at an end of a stack of gaming chips 103. The identification service 215 can determine a second position corresponding to the spacer 106. As the spacer 106 has a width, the identification service 215 can determine the second position as an edge of the spacer 106 nearest to the first position. In some embodiments, a midpoint of the spacer 106 is used and any further calculation of a count of gaming chips 103 involves rounding down to the nearest number of gaming chips 103.

The identification service 215 can determine a distance or span between the first position and the second position. A count of gaming chips 103 in the gaming chip tube can be determined based on the distance. As an example, the identification service 215 can divide the distance by a width of a gaming chip 103. The identification service 215 can round the calculated count to the nearest integral count of gaming chips 103. In some embodiments, if the calculation is outside of a predefined parameters, a remedial action can be taken. The predefined parameters can include a parameter defining maximum count of gaming chips 103 in the gaming chip tube. The predefined parameters can also include a threshold for rounding. According to one example, a threshold can be set to 0.2. In this example, a determined count of 10.1 or 9.9 can be rounded to 10, but a remedial action can be taken if a determined count is 9.6 or 10.4.

The remedial action can include illuminating or activating an indicator to signal to a dealer to lock down the chip tray 109. The display 248 can render information indicated details of the chip tray 109. As an example, the display 248 can render a visual representation of the chip tray 109 including the one or more gaming chip tubes that are outside of a predefined parameter. The identification service 215 can analyze the gaming chips 103 in the problematic gaming chip tube to determine the cause of the issue. As an example, the identification service 215 can identify a space between two gaming chips 103 in a gaming chip tube. As another example, the identification service 215 can identify an improper object located in the gaming chip tube. The identification service 215 can cause the gaming table device 206 to render an image of the chip tray 109 with an overlay indicating the problematic area of the gaming chip tube.

Other remedial actions can include stopping any future games, stopping a game until approval for an authorized user is received, and alerting security. The level of an authorized user can be based on the discrepancy identified. For example, a lower level of authorized user can be required when a rounding error is identified. A higher level of authorized user can be required when a count of gaming chips 103 is below an expected count.

The thresholds may be based on past actions of a dealer or other authorized user associated with the discrepancy. For example, the identification service 215 can identify a dealer with a history that includes a pattern of exceeding thresholds of parameters on a gaming table device 206. The identification service 215 can initiate a more restrictive remedial action based on the repetition. For example, the more restrictive remedial action may require approval from a user with a greater authority.

The identification service 215 can identify a dealer, pit boss, security officer, casino manager, or other casino employee with a history of exceeding thresholds. The identification service 215 can identify an employee with a specific statistical property that exceeds a threshold. As an example, the identification service 215 can calculate a ratio of games played to thresholds exceeded. If the ratio exceeds a threshold, the identification service 215 can initiate a remedial action.

In some embodiments, a gaming chip reader, such as an RFID antenna, can be positioned at the chip tray 109, at each of the bet spots 239, at the chip recycler 242, and in another positions. A gaming chip reader can also be placed at a casino cage, a bank, a vault, or any other location where gaming chips are used. The gaming table device 206 can read RFID tags from RFID-enabled gaming chips 103 using the gaming chip reader. The identification service 215 can reconcile a count of gaming chips 103 from a visual recognition against a read of RFID-enabled gaming chips 103. The identification service 215 can determine if the count from visually recognizing spacers 106 matches a count from reading RFID tags in the gaming chips 103. If the counts fail to match, a remedial action can be taken.

The chip recycler 242 can operate in a similar fashion to a coin recycler. The chip recycler 242 can be used in addition to or in place of chip tray 109. At the end of game or hand, if a dealer has collected gaming chips 103 from patrons, the gaming chips 103 can be placed into an input area, such as a funnel, hopper or tube, and then validated (authenticated), counted, sorted, and stored by the chip recycler 242. If gaming chips 103 are to be paid out to patrons, exchanged for cash, or exchanged for other gaming chips 103, then the gaming table device 206 or the identification service 215 can instruct the chip recycler 242 how much to pay out in gaming chips 103. The denominations to pay out can also be specified. A chip recycler 242 within a cashier cage, a bank or vault, or kiosk (not shown) can operate in a similar fashion. A user places the gaming chips 103 in the chip recycler 242, the chip recycler 242 processes the gaming chips 103, and the chip recycler 242 either automatically outputs gaming chips 103 in other denominations or outputs cash equal to the input value.

Figure 3:
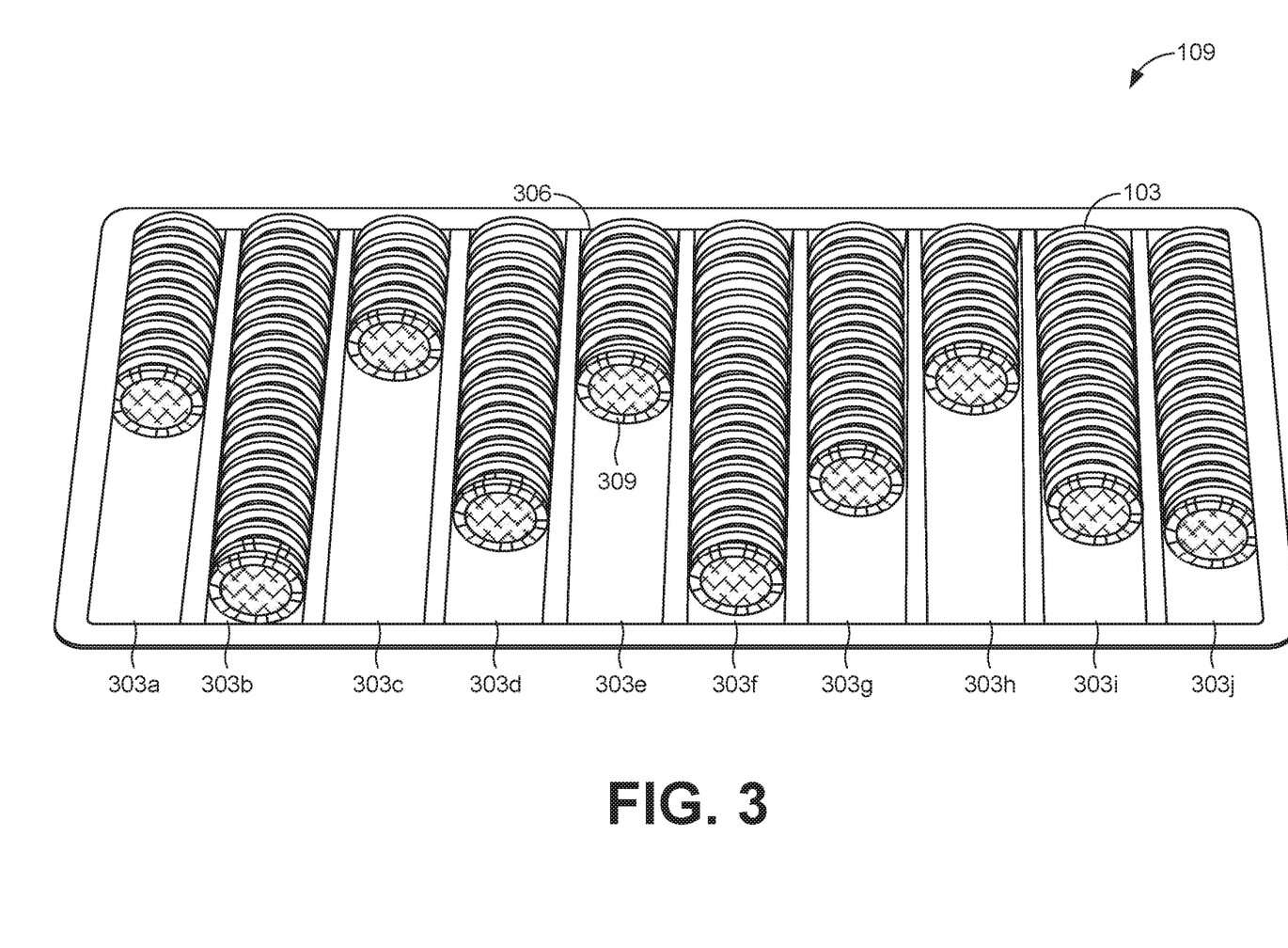
FIG. 3 is a drawing of a chip tray according to various embodiments of the present disclosure.

With reference to FIG. 3, shown is a chip tray 109 according to various embodiments of the present disclosure. The chip tray 109 can include one or more gaming chip tubes 303a-j. Each gaming chip tube 303 can include gaming chips 103 and a spacer 309. The spacer 309 can correspond to a specific spacer 106 as indicated in the chip tray 109.

In one example, the identification service 215 (FIG. 2) can determine a first position 306 for a gaming chip tube 303e. The identification service 215 can determine a second position corresponding to a location of the spacer 309. The identification service 215 can measure a distance between the first position 306 and the spacer 309. The identification service 215 can divide the distance by a width of a gaming chip 103. The result can correspond to a number of gaming chips 103 in the gaming chip tube 303e.

Figure 4:
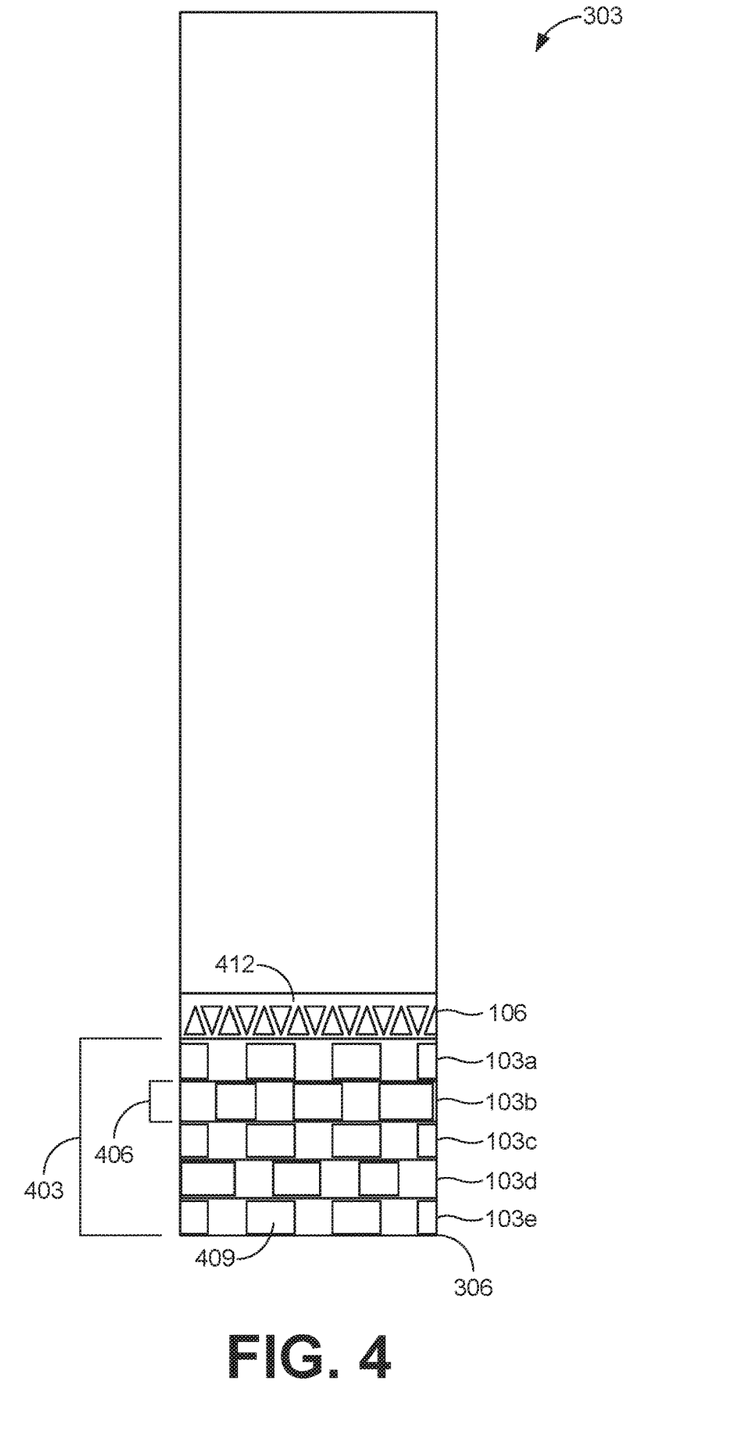
FIG. 4 is a drawing of a gaming chip tube from the chip tray of FIG. 3 according to various embodiments of the present disclosure.
Figure 5A:
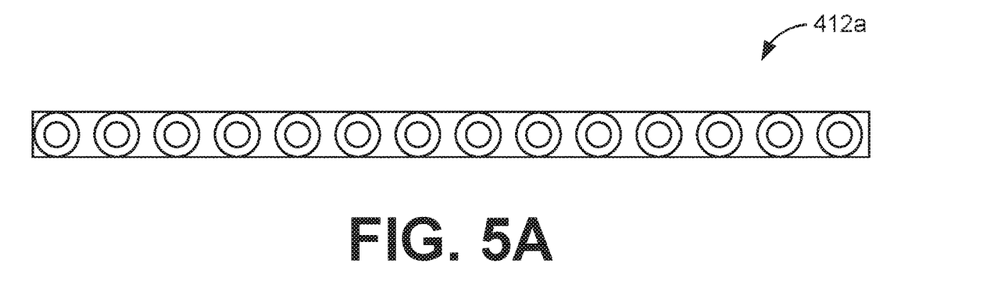
FIGS. 5A-E are drawings of patterns for spacers according to various embodiments of the present disclosure.
Figure 5B:
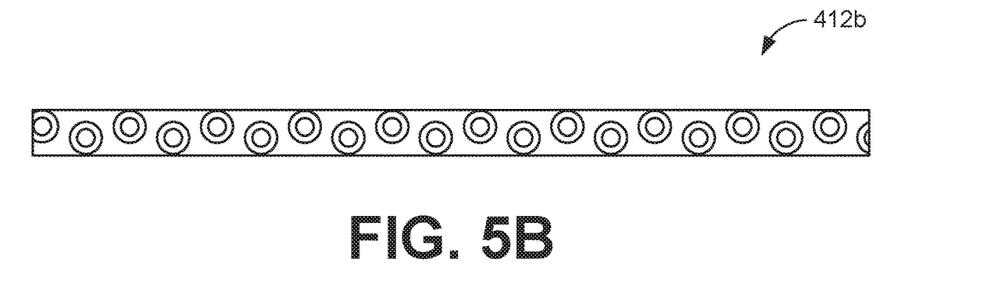
Figure 5C:
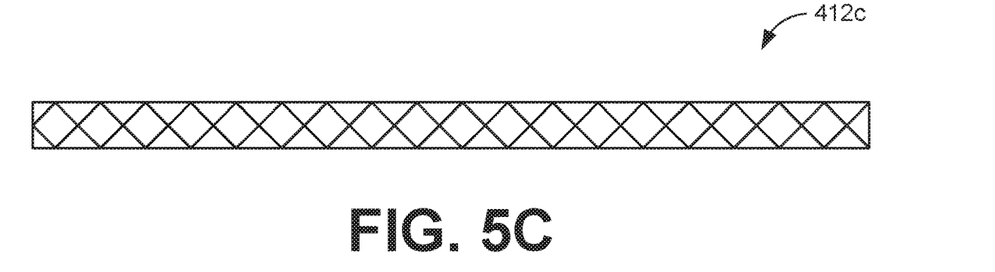
Figure 5D:
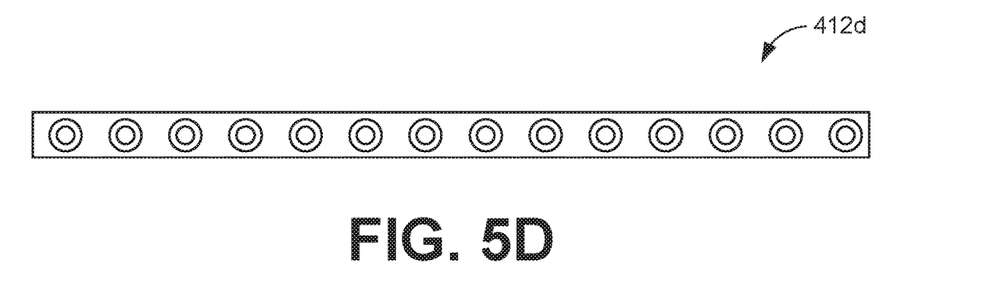
Figure 5E:
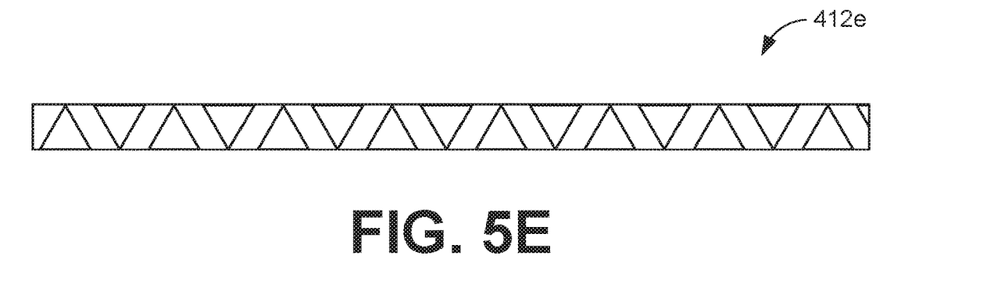

With reference to FIG. 4, shown is a gaming chip tube 303 according to various embodiments of the present disclosure. The gaming chip tube 303 can include gaming chips 103a-e and spacer 106. An edge of the gaming chips can have a first pattern 409 and an edge of the spacer can have a second pattern 412. The first pattern 409 and second pattern 412 can be visually distinct from each other. The visual distinctions can facilitate image recognition of transitions between a gaming chip 103 and a spacer 106.

The identification service 215 can determine the first position 306 and a second position corresponding to the spacer 106. The identification service 215 can determine a distance 403 between the first position 306 and a bottom edge of the spacer 106. The identification service 215 can divide the distance 403 by the width 406 of the gaming chips 103. In the illustrated example in FIG. 4, the identification service 215 can determine that five gaming chips 103a-e are located in the gaming chip tube 303 because the width 406 divides into the distance 403 five times.

With reference to FIGS. 5A-5E, shown are various example patterns 412a-e according to various embodiments of the present disclosure. The patterns 412 can be stored in the data store 212 (FIG. 2) as visual data 218 (FIG. 2). An edge of the spacers 106 (FIG. 1) can have a pattern 412. In some embodiments, the pattern 412 can be printed on the edge or periphery of the spacer. In other embodiments, the pattern 412 can be created by using one or more injections in an injection mold process. The pattern 412 can be selected to be visually distinct from one or more patterns 409 (FIG. 4) that are used for the gaming chips 103.

As shown, the patterns 412a, b, and d include various patterns using concentric circles. The pattern 412c includes diagonal lines crisscrossing across the edge. The pattern 412e includes triangles with each triangle rotated 180 degrees from the previous triangle. The patterns 412 can also have other properties that vary from the patterns 409. As an example, the patterns 412 can include colors that differ from the pattern 409. One or more colors of the pattern 412 can be chosen to maximize visual distinctiveness from one or more colors used on gaming chips 103 of various denominations. As another example, the pattern 412 can include reflective properties. In one embodiment, the concentric circles in pattern 412a are reflective while the background is not reflective. Various other patterns 412 can be used as can be appreciated.

The patterns 412 on the spacer 106 can be designs to be reliably differentiable from the gaming chips 103 during image recognition. The patterns 412 shown in the example embodiments can be differentiated from gaming chips without requiring a high resolution image analysis. As such, the imaging devices 115 can be positioned further from the gaming table 112. Less pixels per spacer 106 and gaming chip 103 may be available based on the imaging device 115 being positioned further away. As one example with the triangles, the height of the spacer 106 can be checked with only 12-15 pixels.

Figure 6:
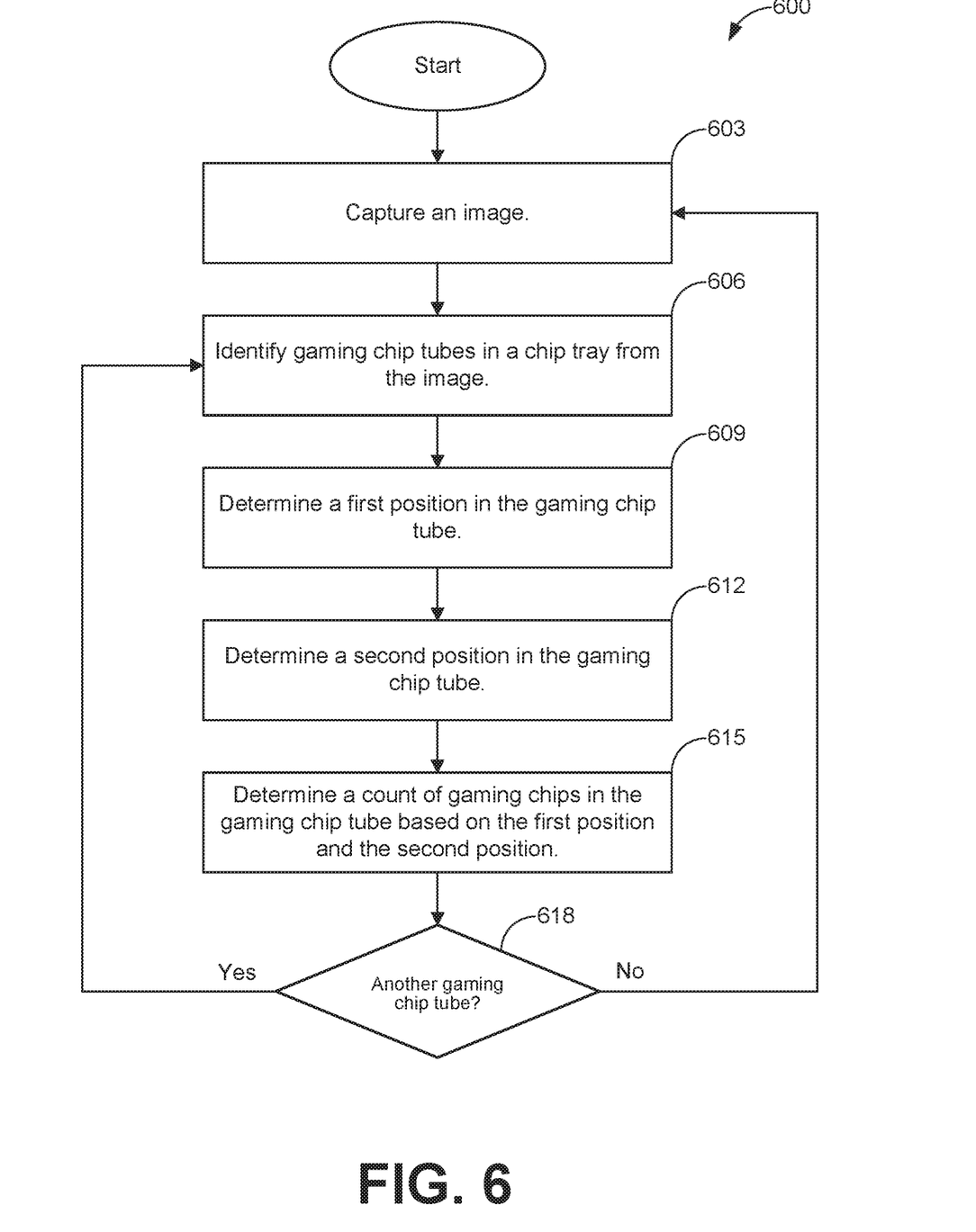
FIG. 6 illustrates an example flowchart of a process implemented in the gaming environment of FIG. 2 according to various embodiments of the present disclosure.

Before turning to the flow diagram of a process 600 shown in FIG. 6, it is noted that embodiments described herein may be practiced using an alternative order of the steps illustrated in FIG. 6. That is, the process flow illustrated in FIG. 6 is provided as an example only, and the embodiments may be practiced using process flows that differ from that illustrated. Additionally, it is noted that not all steps are required in every embodiment. In other words, one or more of the steps may be omitted or replaced, without departing from the scope of the embodiments. Further, steps may be performed in different orders, in parallel with one another, or omitted entirely, and/or certain additional steps may be performed without departing from the scope and spirit of the embodiments.

At box 603, the process 600 can include capturing an image of at least a portion of a chip tray. An imaging device 115 can capture an image of at least a portion of the chip tray 109. The image can correspond to a frame from a video stream from the imaging device 115. The image can be calculated by merging images from two or more imaging devices 115. As an example, a dealer may block part of a field of view 118 for one or more imaging devices 115 during a frame of video. The identification service 215 can create a single image by merging multiple perspectives from multiple imaging devices 115. The identification service 215 can stitch together the single image omitting one or more obstructions of the chip tray 109.

In one embodiment, the image can be calculated based on a keyframe, also called an intra-frame, and one or more frames that are limited to changes. The keyframe can include a complete image while subsequent frames can include changes to the keyframe image. The identification service 215 can apply one or more changes to a most recent previous keyframe image to determine an image to process.

At box 606, the process 600 can include identifying gaming chip tubes in a chip tray from the image. The identification service 215 can perform image recognition on the image to identify a chip tray 109. The image recognition can be based on data stored in visual data 218. The identification service 215 can utilize one or more models or images stored in visual data 218 to identify the chip tray 109.

The identification service 215 can identify one or more gaming chip tubes 303 in the chip tray 109. The identification service 215 can utilize the visual data 218 to identify one or more gaming chip tubes 303 in the image of the chip tray 109. As discussed in boxes 609, 612, and 615, the identification service 215 can process each gaming chip tube 303 to determine a count of gaming chips 103 in each tube.

At box 609, the process 600 can include determining a first position in the gaming chip tube. The identification service 215 can determine a first position in a gaming chip tube 303. The identification service 215 can determine the first position is a first end of the gaming chip tube 303. The first end can correspond to a position of a first gaming chip 103 located in the gaming chip tube 303. In some embodiments, the first position can correspond to the location of a spacer 106 on a first end of a stack of gaming chips 103. The identification service 215 can determine a location of a first spacer 106 by recognizing a pattern of the spacer 106 from the visual data 218 to the image of the gaming chip tube 303.

At box 612, the process 600 can include determining a second position in the gaming chip tube 303. The identification service 215 can determine a second position in a gaming chip tube 303. The second position can correspond to the location of a spacer 106 on a second end of a stack of gaming chips 103. The second end of the stack of gaming chips 103 can be opposite the first position from box 609. The identification service 215 can determine a location of a spacer 106 by recognizing a pattern of the spacer 106 from the visual data 218 to the image of the gaming chip tube 303.

In some embodiments, a spacer 106 can be located on both ends of a stack of gaming chips 103 in the gaming chip tube 303. The spacers 106 can bookend a stack of gaming chips 103. The identification service 215 can visually recognize two spacers 106 in the gaming chip tube 303. The first position can correspond to the first spacer 106 and the second position can correspond to the second spacer 106.

At box 615, the process 600 can include determining a count of the gaming chips in the gaming chip tube 303 based on the first position and the second position. The identification service 215 can determine a distance between the first and second position. The identification service 215 can divide the distance by a width of a gaming chip 103 to determine a count of gaming chips 103 in the gaming chip tube 303.

The identification service 215 can determine a number of pixels between the first position and the second position. The visual data 218 can store known distances that can be utilized to calculate the distance based on the number of pixels. As an example, if a gaming chip 103 is 3 mm wide and seven gaming chips 103 are stacked in a gaming chip tube 303, the identification service 215 can determine a distance of 21 mm between the first position of the gaming chip tube 303 and the spacer 106 at the second position in the gaming chip tube 303. If the identification service 215 determines a distance of 22 mm or 20 mm, the distance can be rounded to identify the count of the seven gaming chips 103.

As an example, the visual data 218 can include a width and length of the chip tray 109 and the gaming chip tube 303. A distance and angle of the imaging device 115 can also be used to calculate the distance.

At box 618, the process 600 can include determining if another gaming chip tube is to be processed. If so, the process 600 moves to box 606 to process the next gaming chip tube 303. Otherwise, the process 600 moves to box 603 to process another image. The other image can be a sequentially next frame in a video stream. The identification service 215 can select the next image on a predefined interval. The next image can be selected based on an event, such as, for example, a start of a wagering game, an end of a wagering game, a start or end of a phase of a wagering game, gaming chips 103 being added or removed from the chip tray 109, or some other event.

Figure 7:
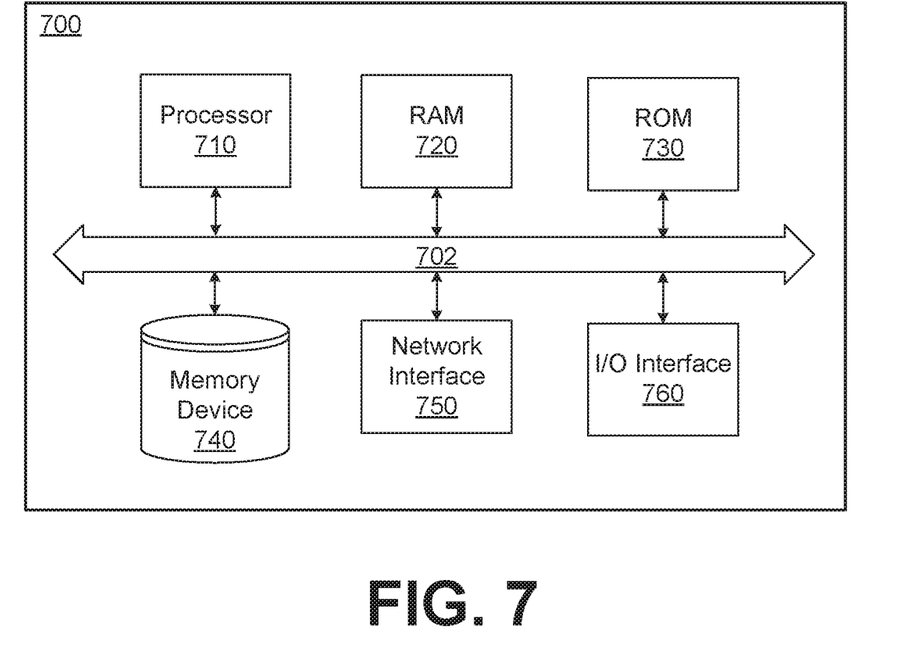
FIG. 7 is a schematic block diagram that illustrates an example computing environment employed in the gaming environment of FIG. 2 according to various embodiments of the present disclosure.

Turning to FIG. 7, an example hardware diagram of a computing device 700 is illustrated. Any of the computing environment 203 including the identification service 215, imaging devices 115, and gaming table devices 206 may be implemented, in part, using one or more elements of the computing device 700. The computing device 700 can include one or more of a processor 710, a Random Access Memory ("RAM") 720, a Read Only Memory ("ROM") 730, a memory device 740, a network interface 750, and an Input Output ("I/O") interface 760. The elements of the computing device 700 are communicatively coupled via a bus 702.

The processor 710 can include an arithmetic processor, Application Specific Integrated Circuit ("ASIC"), or other types of hardware or software processors. The RAM and ROM 720 and 730 can include a memory that stores computer-readable instructions to be executed by the processor 710. The memory device 740 stores computer-readable instructions thereon that, when executed by the processor 710, direct the processor 710 to execute various aspects of the present disclosure described herein. When the processor 710 includes an ASIC, the processes described herein may be executed by the ASIC according to an embedded circuitry design of the ASIC, by firmware of the ASIC, or both an embedded circuitry design and firmware of the ASIC. As a non-limiting example group, the memory device 740 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 750 can include hardware interfaces to communicate over data networks. The I/O interface 760 can include device input and output interfaces such as keyboard, pointing device, display, communication, and other interfaces. The bus 702 can electrically and communicatively couple the processor 710, the RAM 720, the ROM 730, the memory device 740, the network interface 750, and the I/O interface 760, so that data and instructions may be communicated among them.

In operation, the processor 710 is configured to retrieve computer-readable instructions stored on the memory device 740, the RAM 720, the ROM 730, or another storage means, and to copy the computer-readable instructions to the RAM 720 or the ROM 730 for execution, for example. The processor 710 is further configured to execute the computer-readable instructions to implement various aspects and features of the present disclosure. For example, the processor 710 may be adapted and configured to execute the processes described above with reference to FIG. 7, including the processes described as being performed by the identification service 215. Also, the memory device 740 may store the data stored in the data store 212.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Clause 1. A system comprising: at least one imaging device configured to capture at least a portion of a gaming table; and at least one computing device coupled to the at least one imaging device, the at least one computing device configured to at least: capture an image from the at least one imaging device; identify a gaming chip tube in a gaming chip tray; determine a first position corresponding to a bottom of the gaming chip tube; identify a spacer based at least in part on recognizing a predefined pattern on the spacer; determine a second position corresponding to the spacer; and determine a count of gaming chips in the gaming chip tube based at least in part on the first position and the second position.

Clause 2. The system of clause 1, the at least one computing device is further configured to: identify a second gaming chip tube in the gaming chip tray; determine a third position corresponding to a bottom of the second gaming chip tube; identify a second spacer based at least in part on recognizing the predefined pattern on the second spacer; determine a fourth position corresponding to the second spacer; and determine a count of gaming chips in the second gaming chip tube based at least in part on the third position and the fourth position.

Clause 3. The system of clause 1 or 2, further comprising at least one second imaging device configured to capture at least a portion of the gaming chip tray, wherein the at least one computing device is further configured to at least: capture a second image from the at least one second imaging device; determine a third position corresponding to the bottom of the gaming chip tube in the second image; identify the spacer by based at least in part on recognizing the predefined pattern on the spacer in the second image; determine a fourth position corresponding to the spacer; and determine a second count of gaming chips in the gaming chip tube based at least in part on the third position and the fourth position.

Clause 4. The system of clause 3, wherein the at least one computing device is further configured to at least: determine that the count of gaming chips fails to match the second count of gaming chips; and perform a remedial action responsive to the count failing to match the second count.

Clause 5. The system of any of clauses 1-4, wherein the predefined pattern on the spacer differs from a pattern on any of a plurality of denominations of gaming chips.

Clause 6. The system of any of clauses 1-5, wherein the at least one computing device is further configured to calculate a delta of the first position and the second position, wherein the count of the gaming chips is determined as rounding a result of the delta divided by a gaming chip size.

Clause 7. A method comprising: capturing, via at least one imaging device, an image corresponding to a gaming chip tray; identifying, via at least one computing device, a gaming chip tube in the gaming chip tray; determining, via the at least one computing device, a first position corresponding to a bottom of the gaming chip tube; identifying, via the at least one computing device, a spacer based at least in part on recognizing a predefined pattern on the spacer; determining, via the at least one computing device, a second position corresponding to the spacer; and determining, via the at least one computing device, a count of gaming chips in the gaming chip tube based at least in part on the first position and the second position.

Clause 8. The method of clause 7, further comprising: identifying, via the at least one computing device, a second gaming chip tube in the gaming chip tray; determining, via the at least one computing device, a third position corresponding to a bottom of the second gaming chip tube; identifying, via the at least one computing device, a second spacer based at least in part on recognizing a second predefined pattern on the second spacer; determining, via the at least one computing device, a fourth position corresponding to the second spacer; and determining, via the at least one computing device, a count of gaming chips in the second gaming chip tube based at least in part on the third position and the fourth position.

Clause 9. The method of clause 7 or 8, further comprising: obtaining, via the at least one computing device, a second image from at least one second imaging device; determining, via the at least one computing device, a third position corresponding to the bottom of the gaming chip tube in the second image; identifying, via the at least one computing device, the spacer based at least in part on recognizing the predefined pattern on the spacer in the second image; determining, via the at least one computing device, a fourth position corresponding to the spacer; and determining, via the at least one computing device, a second count of gaming chips in the gaming chip tube based at least in part on the third position and the fourth position.

Clause 10. The method of clause 9, further comprising: determining, via the at least one computing device, that the count of gaming chips fails to match the second count of gaming chips; and in response to determining that the count of gaming chips fails to match the second count of gaming chips, performing a remedial action.

Clause 11. The method of any of clauses 7-10, further comprising capturing, via the at least one imaging device, at least a portion of a gaming table.

Clause 12. The method of any of clauses 7-11, wherein the predefined pattern on the spacer differs from a pattern on any of a plurality of denominations of gaming chips.

Clause 13. The method of any of clauses 7-12, further comprising calculating, via the at least one computing device, a delta of the first position and the second position, wherein the count of the gaming chips is determined as rounding a result of the delta divided by a gaming chip size.

Clause 14. A non-transitory computer-readable medium embodying a program, that when executed by at least one computing device, causes the at least one computing device to at least: obtain an image from at least one imaging device; identify a gaming chip tube in a gaming chip tray; determine a first position corresponding to a bottom of the gaming chip tube; identify a spacer based at least in part on recognizing a predefined pattern on the spacer; determine a second position corresponding to the spacer; and determine a count of gaming chips in the gaming chip tube based at least in part on the first position and the second position.

Clause 15. The non-transitory computer-readable medium of clause 14, wherein the program further causes the at least one computing device to at least: identify a second gaming chip tube in the gaming chip tray; determine a third position corresponding to a bottom of the second gaming chip tube; identify a second spacer based at least in part on recognizing a second predefined pattern on the second spacer; determine a fourth position corresponding to the second spacer; and determine a count of gaming chips in the second gaming chip tube based at least in part on the third position and the fourth position.

Clause 16. The non-transitory computer-readable medium of clause 14 or 15, wherein the program further causes the at least one computing device to at least: obtain a second image from at least one second imaging device; determine a third position corresponding to the bottom of the gaming chip tube in the second image; identify the spacer based at least in part on recognizing the predefined pattern on the spacer in the second image; determine a fourth position corresponding to the spacer; and determine a second count of gaming chips in the gaming chip tube based at least in part on the third position and the fourth position.

Clause 17. The non-transitory computer-readable medium of clause 16, wherein the program further causes the at least one computing device to at least: determine that the count of gaming chips fails to match the second count of gaming chips; and perform a remedial action.

Clause 18. The non-transitory computer-readable medium of any of clauses 14-17, wherein the at least one imaging device is configured to capture at least a portion of a gaming table.

Clause 19. The non-transitory computer-readable medium of any of clauses 14-18, wherein the predefined pattern on the spacer differs from a pattern on any of a plurality of denominations of gaming chips.

Clause 20. The non-transitory computer-readable medium of any of clauses 14-19, wherein the program further causes the at least one computing device to at least calculate a delta of the first position and the second position, wherein the count of the gaming chips is determined as rounding a result of the delta divided by a gaming chip size.

The invention claimed is:

1. A system comprising:
at least one imaging device; and
at least one computing device coupled to the at least one imaging device;
wherein:
the at least one imaging device is configured to capture at least a portion of a gaming table to generate an image; and
the at least one computing device is configured to:
obtain the image from the at least one imaging device;
identify a gaming chip tube in a gaming chip tray;
determine a first position corresponding to an end of a first plurality of gaming chips stacked in the gaming chip tube;
identify a spacer based at least in part on recognizing a predefined pattern on the spacer;
determine a second position corresponding to the spacer; and
determine a first count of the first plurality of gaming chips in the gaming chip tube based at least in part on the first position and the second position.

2. The system of claim 1, wherein the at least one computing device is further configured to:
identify a second gaming chip tube in the gaming chip tray;
determine a third position corresponding to an end of a second plurality of gaming chips stacked in the second gaming chip tube;
identify a second spacer based at least in part on recognizing the predefined pattern on the second spacer;
determine a fourth position corresponding to the second spacer; and
determine a second count of the second plurality of gaming chips in the second gaming chip tube based at least in part on the third position and the fourth position.

3. The system of claim 1, further comprising at least one second imaging device, wherein the at least one second imaging device is configured to capture at least a portion of the gaming chip tray, and the at least one computing device is further configured to:
obtain a second image from the at least one second imaging device;
determine a third position corresponding to the end of the first plurality of gaming chips in the second image;
identify the spacer based at least in part on recognizing the predefined pattern on the spacer in the second image;
determine a fourth position corresponding to the spacer identified using the second image; and
determine a second count of the first plurality of gaming chips in the gaming chip tube based at least in part on the third position and the fourth position.

4. The system of claim 3, wherein the at least one computing device is further configured to:
determine that the second count of the first plurality of gaming chips fails to match the first count of the first plurality of gaming chips; and
perform a remedial action responsive to the determination that the first count fails to match the second count.

5. The system of claim 1, wherein the predefined pattern on the spacer differs from a pattern on any of a plurality of denominations of the first plurality of gaming chips.

6. The system of claim 1, wherein the at least one computing device is further configured to calculate a delta between the first position and the second position, and determine the first count of the first plurality of gaming chips by rounding a result of the delta divided by a predefined gaming chip size.

7. The system of claim 1, wherein the end of the first plurality of gaming chips corresponds to a bottom of the gaming chip tube.

8. A method comprising:
   capturing, via at least one imaging device, an image corresponding to a gaming chip tray;
   identifying, via at least one computing device, a gaming chip tube in the gaming chip tray;
   determining, via the at least one computing device, a first position corresponding to an end of a first plurality of gaming chips stacked in the gaming chip tube;
   identifying, via the at least one computing device, a spacer based at least in part on recognizing a predefined pattern on the spacer;
   determining, via the at least one computing device, a second position corresponding to the spacer; and
   determining, via the at least one computing device, a first count of the first plurality of gaming chips in the gaming chip tube based at least in part on the first position and the second position.

9. The method of claim 8, further comprising:
   identifying, via the at least one computing device, a second gaming chip tube in the gaming chip tray;
   determining, via the at least one computing device, a third position corresponding to an end of a second plurality of gaming chips stacked in the second gaming chip tube;
   identifying, via the at least one computing device, a second spacer based at least in part on recognizing a second predefined pattern on the second spacer;
   determining, via the at least one computing device, a fourth position corresponding to the second spacer; and
   determining, via the at least one computing device, a second count of the second plurality of gaming chips in the second gaming chip tube based at least in part on the third position and the fourth position.

10. The method of claim 8, further comprising:
    obtaining, via the at least one computing device, a second image from at least one second imaging device;
    determining, via the at least one computing device, a third position corresponding to the end of the first plurality of the gaming chips in the second image;
    identifying, via the at least one computing device, the spacer based at least in part on recognizing the predefined pattern on the spacer in the second image;
    determining, via the at least one computing device, a fourth position corresponding to the spacer identified using the second image; and
    determining, via the at least one computing device, a second count of the first plurality of gaming chips in the gaming chip tube based at least in part on the third position and the fourth position.

11. The method of claim 10, further comprising:
    determining, via the at least one computing device, that the first count of the first plurality of gaming chips fails to match the second count of the first plurality of gaming chips; and
    in response to determining that the first count of the first plurality of gaming chips fails to match the second count of the first plurality of gaming chips, performing a remedial action.

12. The method of claim 8, wherein the image is captured by the at least one imaging device capturing at least a portion of a gaming table.

13. The method of claim 8, wherein the predefined pattern on the spacer differs from a pattern on any of a plurality of denominations of the first plurality of gaming chips.

14. The method of claim 8, further comprising calculating, via the at least one computing device, a delta between the first position and the second position, wherein the first count of the first plurality of gaming chips is determined by rounding a result of the delta divided by a gaming chip size.

15. The method of claim 8, wherein the end of the first plurality of gaming chips corresponds to a bottom of the gaming chip tube.

16. A non-transitory computer-readable medium on which is stored a program that is executable by at least one computing device and that, when executed by the at least one computing device, causes the at least one computing device to:
    obtain an image from at least one imaging device;
    identify a gaming chip tube in a gaming chip tray;
    determine a first position corresponding to an end of a first plurality of gaming chips stacked in the gaming chip tube;
    identify a spacer based at least in part on recognizing a predefined pattern on the spacer;
    determine a second position corresponding to the spacer; and
    determine a first count of the first plurality of gaming chips in the gaming chip tube based at least in part on the first position and the second position.

17. The non-transitory computer-readable medium of claim 16, wherein the program, when executed by the at least one computing device, further causes the at least one computing device to:
    identify a second gaming chip tube in the gaming chip tray;
    determine a third position corresponding to an end of a second plurality of the gaming chips stacked in the second gaming chip tube;
    identify a second spacer based at least in part on recognizing a second predefined pattern on the second spacer;
    determine a fourth position corresponding to the second spacer; and
    determine a second count of the second plurality of gaming chips in the second gaming chip tube based at least in part on the third position and the fourth position.

18. The non-transitory computer-readable medium of claim 16, wherein the program, when executed, further causes the at least one computing device to:
    obtain a second image from at least one second imaging device;
    determine a third position corresponding to the end of the first plurality of gaming chips in the second image;
    identify the spacer based at least in part on recognizing the predefined pattern on the spacer in the second image;
    determine a fourth position corresponding to the spacer; and
    determine a second count of the first plurality of gaming chips in the gaming chip tube based at least in part on the third position and the fourth position.

19. The non-transitory computer-readable medium of claim 18, wherein the program, when executed, further causes the at least one computing device to:
    determine that the first count of the first plurality of gaming chips fails to match the second count of the first plurality of gaming chips; and
    perform a remedial action.

20. The non-transitory computer-readable medium of claim 16, wherein the image is captured by the at least one imaging device capturing at least a portion of a gaming table.

21. The non-transitory computer-readable medium of claim 16, wherein the predefined pattern on the spacer differs from a pattern on any of a plurality of denominations of the first plurality of gaming chips.

22. The non-transitory computer-readable medium of claim 16, wherein the program, when executed, further causes the at least one computing device to calculate a delta between the first position and the second position, and the first count of the first plurality of gaming chips is determined by rounding a result of the delta divided by a gaming chip size.

23. The non-transitory computer-readable medium of claim 16, wherein the end of the first plurality of gaming chips corresponds to a bottom of the gaming chip tube.

24. A system comprising:
at least one imaging device; and
at least one computing device coupled to the at least one imaging device;
wherein:
   the at least one imaging device is configured to capture at least a portion of a gaming table to generate an image; and
   the at least one computing device is configured to:
      obtain the image from the at least one imaging device;
      identify a spacer based at least in part on recognizing a predefined pattern on the spacer;
      identify a plurality of gaming chips that are stacked as a gaming chip stack in a gaming chip tube and that include the spacer on an end; and
      determine a count of the plurality of gaming chips in the gaming chip tube based at least in part on a height of the gaming chip stack.

\* \* \* \* \*